(12) United States Patent
Hailpern et al.

(10) Patent No.: US 10,812,498 B2
(45) Date of Patent: Oct. 20, 2020

(54) PLAYBOOK-BASED SECURITY INVESTIGATIONS USING A CARD SYSTEM FRAMEWORK

(71) Applicant: HEWLETT PACKARD ENTERPRISE DEVELOPMENT LP, Houston, TX (US)

(72) Inventors: Joshua Hailpern, Santa Clara, CA (US); Ronald Calvo, Sunnyvale, CA (US); Suhas Shetty, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 239 days.

(21) Appl. No.: 15/720,357

(22) Filed: Sep. 29, 2017

(65) Prior Publication Data
US 2019/0104137 A1 Apr. 4, 2019

(51) Int. Cl.
*G06F 21/00* (2013.01)
*H04L 29/06* (2006.01)
*G06F 16/20* (2019.01)
*G06F 21/55* (2013.01)

(52) U.S. Cl.
CPC .......... *H04L 63/1416* (2013.01); *G06F 16/20* (2019.01); *G06F 21/55* (2013.01); *G06F 21/554* (2013.01); *H04L 63/1408* (2013.01); *H04L 63/1425* (2013.01); *G06F 2221/032* (2013.01)

(58) Field of Classification Search
CPC ............................... G06F 21/55; G06F 21/554
USPC ......................................................... 726/23
See application file for complete search history.

(56) References Cited

U.S. PATENT DOCUMENTS

| 8,266,072 | B2 | 9/2012 | Grace et al. |
| 9,386,041 | B2 | 7/2016 | Carver et al. |
| 9,996,881 | B2* | 6/2018 | Mdeway ............... G06Q 40/08 |
| 2002/0087383 | A1 | 7/2002 | Cogger et al. |
| 2011/0041058 | A1 | 2/2011 | Butler et al. |
| 2016/0306979 | A1* | 10/2016 | Kotler .................. G06F 21/577 |

(Continued)

OTHER PUBLICATIONS

Brandon Enright, Using a "Playbook" Model to Organize Your Information Security Monitoring Strategy, (Research Paper), Nov. 1, 2013, 9 Pgs.

(Continued)

*Primary Examiner* — Anthony D Brown
(74) *Attorney, Agent, or Firm* — Hewlett Packard Enterprise Patent Department

(57) ABSTRACT

Examples disclosed herein relate to playbook-based security investigations using a card system framework. Some of the examples enable receiving an indication that a playbook is selected for investigating a security alert object, the playbook comprising a plurality of cards, wherein a first object definition associated with the security alert object comprises a parameter, and wherein the playbook inherits a value of the parameter from the first object definition; causing a first card from the playbook to be displayed on a user interface, the first card comprising a first content tile that describes the security alert object; and causing a second card from the playbook to be displayed on the user interface, the second card comprising a second content tile that describes a second object, wherein a second object definition associated with the second object comprises the parameter inherited from the first object definition.

21 Claims, 11 Drawing Sheets

(56) References Cited

U.S. PATENT DOCUMENTS

2017/0048264 A1 2/2017 Chauhan et al.
2017/0063901 A1 3/2017 Muddu et al.

OTHER PUBLICATIONS

Demisto Launches "Nucleus" Partner Program to Meet Rapidly Growing Global Demand for Demisto, (Research Paper), Jun. 21, 2017, 5 Pgs.
Greg Kushto, Why playbooks belong in every agency's cyber toolkit, (Research Paper), Mar. 9, 2017, 4 Pgs.
Reselve Systems, A Complete Security Incident Response Platform, (Research Paper), 2017, 14 Pgs.
European Search Report and Search Opinion Received for EP Application No. 18197300.9, dated Jan. 4, 2019, 7 pages.

* cited by examiner

PLAYBOOK-BASED SECURITY INVESTIGATIONS USING A CARD SYSTEM FRAMEWORK

BACKGROUND

The amount of information available from the Internet and in an enterprise environment is continually on the rise. User experience for the end users of the information often depend on how the information is organized, presented, and displayed on a user interface, how the information is stored, and how the information is shared with others.

BRIEF DESCRIPTION OF THE DRAWINGS

The following detailed description references the drawings, wherein.

DETAILED DESCRIPTION

Figure 1:
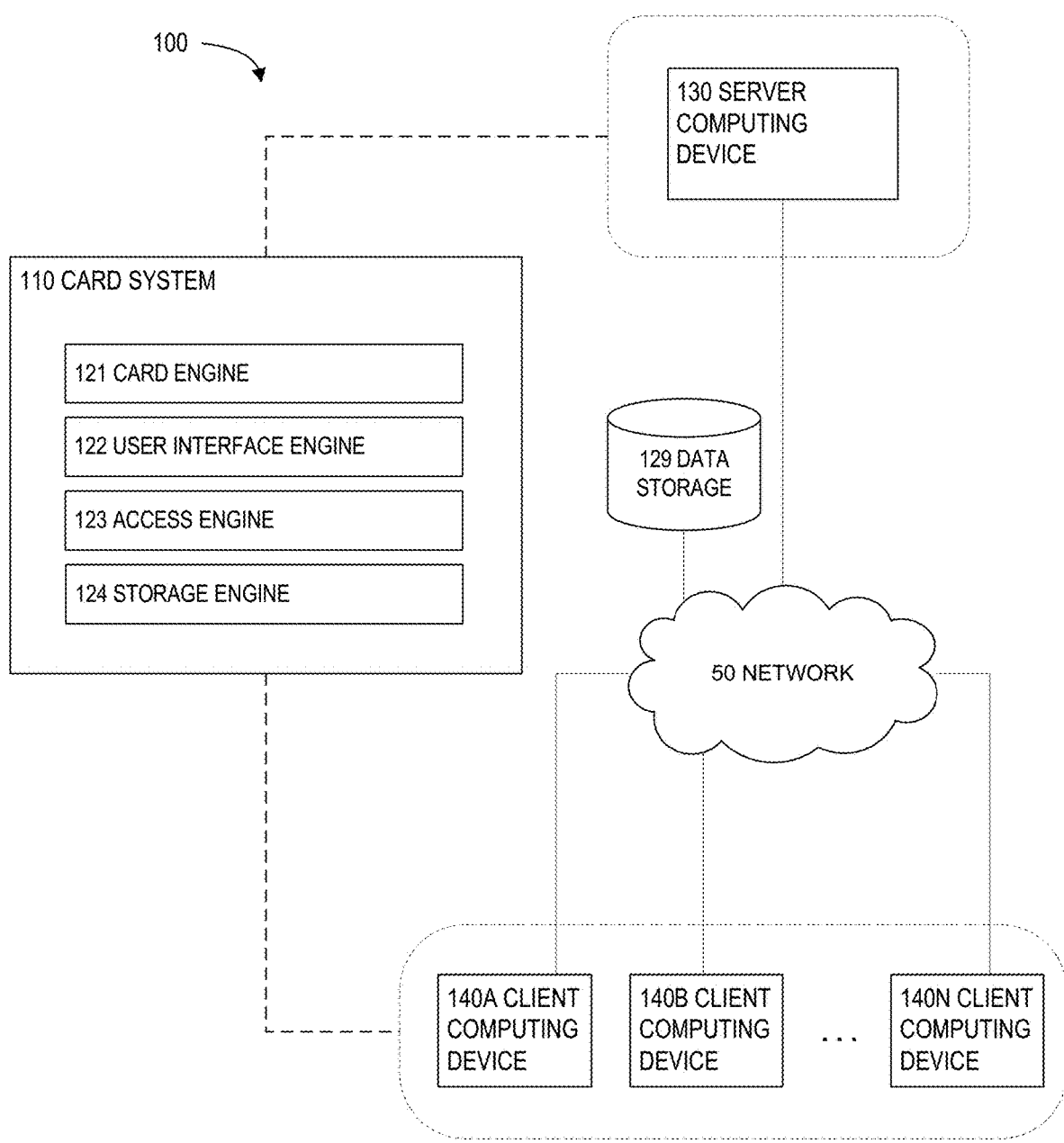
FIG. 1 is a block diagram depicting an example environment in which various examples may be implemented as a card system.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The amount of information available from the Internet and in an enterprise environment is continually on the rise. User experience for the end users of the information often depend on how the information is organized, presented, and displayed on a user interface, how the information is documented or stored, and how the information is shared with others. In one example, a security analyst who wishes to investigate or research on a security alert (e.g., an alert about a potential security threat) often need to review and analyze large amounts of data related to the alert. This may require the analyst to access multiple different data sources to find relevant data. Even if the data can be found, the investigation steps and the data analyzed during each of those steps are not automatically documented or stored. In addition, the history of investigation is not readily available to other analysts to review or continue with the investigation. In addition, the data retrieved for one investigation is not easily reusable in another investigation, taking unnecessary compute power and time for data retrieval. In some instances, it might be helpful to provide better guidance for the analyst to follow while investigating to enhance the quality of investigation.

Examples disclosed herein provide technical solutions to these technical challenges by enabling playbook-based security investigations using a card system framework. The card system framework may organize relevant data in a card format. A "card," as used herein, refers to a reusable component that behaves like a shell or template that can support any content in it. A card may comprise a card header, a content tile, and/or other elements. A "content tile," as used herein, refers to a reusable component that delivers the main content of the card. When a card is presented on a user interface, a user may request more details on a particular content item in the content tile. This user selection (e.g., clicking on a link for the particular content item, hovering the cursor over the particular content item, and/or other ways to indicate the selection) would trigger another card to be displayed on the user interface where the new card has a content tile that includes the requested details for the particular content item. As the user continues to interact with various cards being presented on the user interface and request additional details about certain content items, more cards would appear on the user interface. This collection of cards would provide a well-documented history of the user's research or investigation. The collection of cards can be also shared with another user or users to view, edit, and/or make a duplicate card or a duplicate collection of cards. The content tile may be reusable, meaning that a particular content tile can be reused as a standalone component without a card, or reused in a single card or multiple different cards. Therefore, using such a card system framework, relevant data can be organized and presented in a more meaningful way, the history of research on the relevant data (e.g., how the research was conducted) can be effectively documented and shared with others, and the content tiles generated during the research can be captured, stored, and reused in other contexts.

In some implementations, a playbook may be used to guide users through their research or investigation. A "playbook," as used herein, refers to a predefined set of cards that aim to provide guidance through one's research or investigation about a certain object or topic of interest. For example, a playbook may help walk a security analyst through an investigation of a security alert by providing details about the steps that the analyst should take to resolve the investigation. The playbook may also have a corresponding question (and/or a capability to receive and log an answer from the user) for each step to help guide the user through the investigation process and help the user's understanding of the data being presented. The playbook may provide a playbook conclusion card to help the user determine the outcome of the investigation.

Some of the examples disclosed herein enable receiving an indication that a playbook is selected for investigating a security alert object, the playbook comprising a plurality of cards, wherein a first object definition associated with the security alert object comprises a parameter, and wherein the playbook inherits a value of the parameter from the first object definition; causing a first card from the playbook to be displayed on a user interface, the first card comprising a first content tile that describes the security alert object; and causing a second card from the playbook to be displayed on the user interface, the second card comprising a second content tile that describes a second object, wherein a second object definition associated with the second object comprises the parameter inherited from the first object definition.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

FIG. 1 is an example environment 100 in which various examples may be implemented as a card system 110. Environment 100 may include various components including server computing device 130 and client computing devices 140 (illustrated as 140A, 140B, . . . , 140N). Each client computing device 140A, 140B, . . . , 140N may communicate requests to and/or receive responses from server computing device 130. Server computing device 130 may receive and/or respond to requests from client computing devices 140. Client computing devices 140 may be any type of computing device providing a user interface through which a user can interact with a software application. For example, client computing devices 140 may include a laptop computing device, a desktop computing device, an all-in-one computing device, a thin client, a workstation, a tablet computing device, a mobile phone, an electronic book reader, a network-enabled appliance such as a "Smart" television, and/or other electronic device suitable for displaying a user interface and processing user interactions with the displayed interface. While server computing device 130 is depicted as a single computing device, server computing device 130 may include any number of integrated or distributed computing devices serving at least one software application for consumption by client computing devices 140.

The various components (e.g., components 129, 130, and/or 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, card system 110 and the various components described herein may be implemented in hardware and/or a combination of hardware and programming that configures hardware. Furthermore, in FIG. 1 and other Figures described herein, different numbers of components or entities than depicted may be used.

Card system 110 may comprise a card engine 121, a user interface engine 122, an access engine 123, a storage engine 124, and/or other engines. The term "engine", as used herein, refers to a combination of hardware and programming that performs a designated function. As is illustrated respect to FIGS. 3-4, the hardware of each engine, for example, may include one or both of a processor and a machine-readable storage medium, while the programming is instructions or code stored on the machine-readable storage medium and executable by the processor to perform the designated function.

Card engine 121 may generate a card and/or a content tile therein. A "card," as used herein, refers to a reusable component that behaves like a shell or template that can support any content in it, including any number of content tiles. Thus, a card may act as a shell that encapsulates any number of content tiles. A card may comprise a card header, a content tile, and/or other elements. A card header may comprise a title and/or sub-title(s) that briefly describe the card and/or the content tile thereof. In some implementations, the header may include other information such as a timeframe associated with the card (e.g., a timeframe associated with a particular security alert) and an identifier associated with the card (e.g., an alert identifier, a user identifier, etc.). The header may be composed of any textual (e.g., a string, a dropdown menu), visual (e.g., graphical icons), and/or audio data. A display section for the card header may appear visually different (e.g., different in color, shade, pattern, etc.) from the rest of the card to make the header relatively more noticeable. A "security alert," as used herein, refers to an alert notifying interested parties regarding a potential security threat or cyberattack.

A "content tile," as used herein, refers to a reusable component that delivers the main content of the card. Similar to the card header, a content tile may be composed of any textual (e.g., a string, a dropdown menu), visual (e.g., graphical icons, graphs, charts, tables), and/or audio (e.g., a voice record) data. The content tile may be reusable, meaning that a particular content tile can be reused as a standalone component without a card, or reused in a single card or multiple different cards. For example, a content tile in a first card may be decoupled from the first card such that the content tile can be used for a second card that is different from the first card, or the content tile may be used without being associated with any card (e.g., reused as a standalone component without a card).

Figure 7:
FIG. 7 is a diagram depicting an example user interface for presenting a card.
Figure 8:
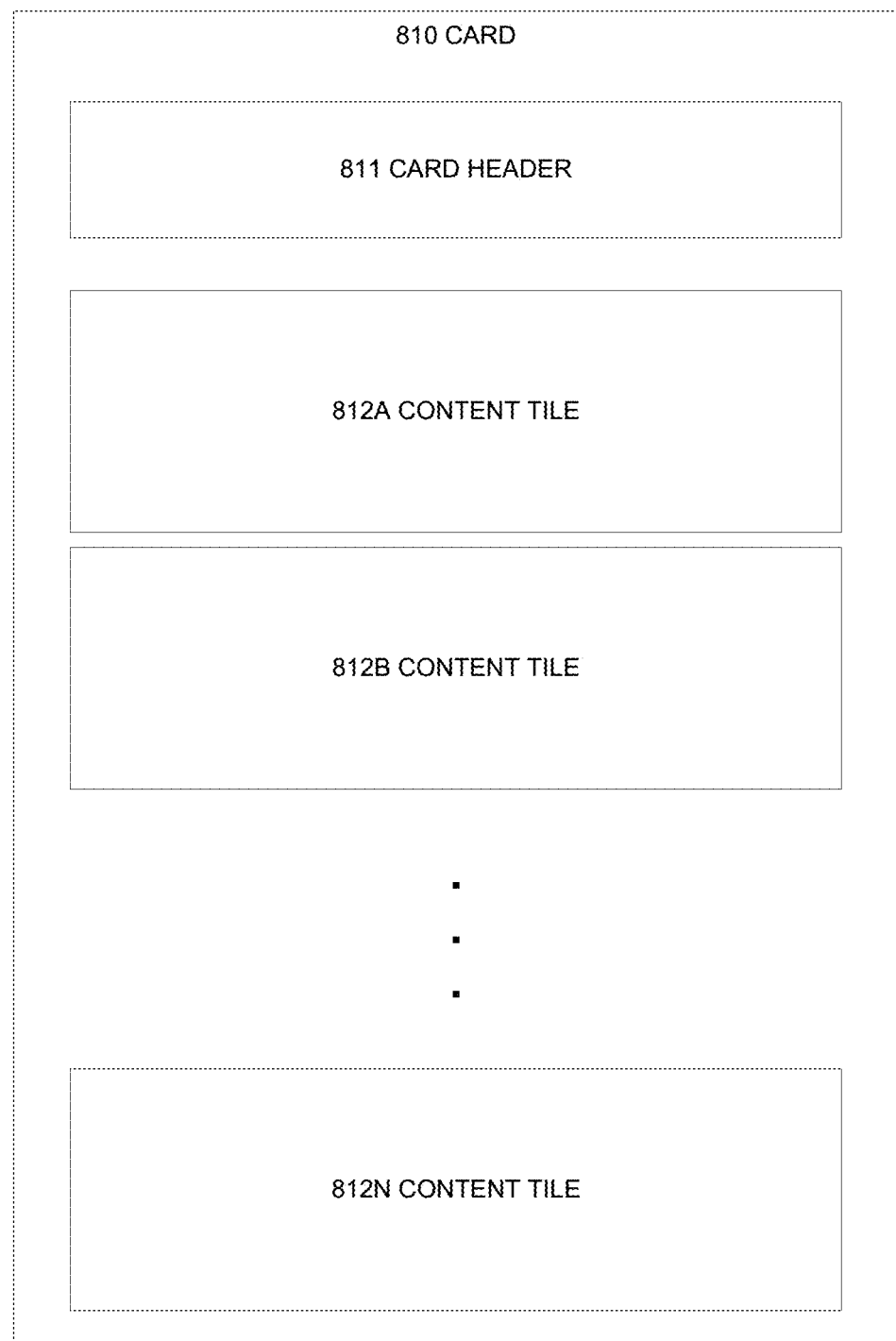
FIG. 8 is a diagram depicting an example user interface for presenting a card with a plurality of content tiles.

In the example illustrated in FIG. 7, a card 710 has a card header 711 and a content tile 712. Although two elements 711 and 712 are shown in the example, card 710 may include more than one card header, more than one content tile, and/or other elements other than the two elements. FIG. 8 provides an example of a card 810 that includes more than one content tile (e.g., content tile 812A, 812B, . . . , 812N).

A content tile (e.g., content tile 712 in FIG. 7) may describe a particular object that is associated with a plurality of content items. An "object," as used herein, refers to any object, including an alert, a user, a source host, an IP address, and/or other security or non-security related entity or object, that a card (and the content tile thereof) describes and provides content for by providing a plurality of content items within the content tile.

When a card is presented on a user interface, a user may request more details on a particular content item in the content tile. This user selection (e.g., clicking on a link for the particular content item, hovering the cursor over the particular content item, and/or other ways to indicate the user selection) would trigger another card to be displayed on the user interface where the new card has a content tile that includes the requested details for the particular content item. A "user," as used herein, refers to any user who may create, view, edit, make a duplicate of, or otherwise access various cards in the card system framework. In some instances, a "user," as used herein, refer to a user associated with a user identifier that appears in a card. For example, a user identifier of a potential attacker may be recorded along with its associated security alerts, IP addresses, ports being used, etc. When the user identifier is clicked from a first card, a second card may be presented having a content tile that describes this potential attacker being associated with this user identifier. The content tile may include the security alerts, IP addresses, ports being used, and/or other tracked information associated with the user identifier.

In the example illustrated in FIG. 9, a first card (e.g., a card 910) may be presented on a user interface (e.g., via user interface engine 122 as further discussed below). The first card comprises a first card header (e.g., a card header 911) and a first content tile (e.g., a content tile 912). The first content tile may describe a first object that is associated with a first plurality of content items. Once card engine 121 receives, via the user interface, an indication that a first content item (among the first plurality of content items) is requested about the first object, card engine 121 may generate a second card (e.g., a card 920) to be presented on the user interface. The indication that the first content item is requested about the first object may comprise a user selection of a graphical user interface (GUI) element associated with the first content item of the first card. For example, the first content item, a source host identifier, may be hyperlinked for a user to click on. The GUI element comprising the hyperlinked textual string for the source host identifier, once clicked, would cause the second card to appear on the user interface where the second card comprises a second content tile (e.g., a content tile 922) that describes the source host identifier (e.g., a second object). A second plurality of content items in the second content tile may include content about the particular source host, including, but not being limited to: a number of alerts associated with the source host identifier, a description of alerts associated with the source host identifier, a risk score associated with the source host identifier, and a predicted attack path based on a historical information associated with the source host identifier.

In some implementations, not all content items in the first plurality of content items are available for a user selection. This means that the GUI elements associated with some content items among the first plurality of content items may be unavailable for a user selection. For example, while the GUI element for the source host identifier is hyperlinked (therefore is clickable), the GUI element for the severity level (e.g., a second content item of the first card) is not hyperlinked (therefore is not clickable).

In some implementations, card engine 121 may receive, via the user interface, an indication that a third content item (among the first plurality of content items) is requested about the first object. In response to that indication, card engine 121 may generate a third card (e.g., a card 930 in FIG. 9) to be presented on the user interface. The third content item may be an IP address. The third card may comprise a third content tile (e.g., a content tile 932 in FIG. 9) that describes the particular IP address (e.g., a third object). A third plurality of content items in the third content tile may include content about the particular IP address, including, but not being limited to: a port associated with the IP address, an alert associated with the IP address, a risk score associated with the IP address, and a predicted attack path based on a historical information associated with the IP address. In other implementations, the third card (e.g., card 930 in FIG. 9) may be presented in response to an indication that a content item (among the second plurality of content items) is requested about the second object, instead of the first object. Based on a user selection of one of the content items in the second card, the third card about the selected content item may appear on the user interface as the next card. In these implementations, the selected content item may be a user identifier. The third card may then comprise a third content tile (e.g., content tile 932 in FIG. 9) that describes the particular user identifier (e.g., a third object). A third plurality of content items in the third content tile may include content about the particular user identifier, including, but not being limited to: an IP address associated with the user identifier, a port associated with the user identifier, an alert associated with the user identifier, a risk score associated with the user identifier, and a predicted attack path based on a historical information associated with the user identifier.

In response to an indication that a particular content item is requested about a particular object, card engine 121 may generate an object definition in the card system framework where the object definition comprises a target card property and/or a source card property. The target card property and/or source card property may comprise at least one parameter. The parameter(s) may be used to retrieve content items for the next card, or in other words, the target card. The parameter(s) may include, but not be limited to: (i) a timeframe within which timestamps of the content items to be retrieved for the target card should be, (ii) an object or user identifier, (iii) a status, and (iv) a category.

Returning to the above example, once card engine 121 receives, via the user interface, an indication that the first content item (among the first plurality of content items) is requested about the first object, card engine 121 may generate a second object definition. The second object definition may comprise a target card property that refers to the second card (e.g., card 920 in FIG. 9) to be presented on the user interface. The second object definition may comprise a source card property that refers to the first card (e.g., card 910 in FIG. 9). Card engine 121 may retrieve the second plurality of content items for the second card based on the target card property of the second object definition. Therefore, the resulting second card may comprise the second content tile (e.g., content tile 922 in FIG. 9) that includes the second plurality of content items. Similarly, if card engine 121 subsequently receives, via the user interface, an indication that the second content item (among the first plurality of content items) is requested about the first object, card engine 121 may generate a third object definition. The third object definition may comprise a target card property that refers to the third card (e.g., card 930 in FIG. 9) to be presented on the user interface. The third object definition may comprise a source card property that refers to the first card (e.g., card 910 in FIG. 9).

The parameter(s) of the second object definition may be originated from a first object definition for the first card. When a new (or second) object definition is generated for a next (or second) card, the new (or second) object definition may automatically inherit value(s) of the parameter(s) from the previous (or first) object definition for the previous (or first) card. In other words, the timeframe associated with the second plurality of content items in the second card (e.g., a timeframe within which timestamps of the second plurality of content items to be retrieved for the second card should be) would be the same timeframe associated with the first plurality of content items in the first card (e.g., a timeframe within which the timestamps of the first plurality of content items were). In some implementations, card engine 121 may modify a value of a parameter to be inherited by the second object definition. The timeframe that was inherited by the second object definition from the first object definition may be changed to a different timeframe, for example, based on user input.

In some implementations, card engine 121 may retrieve the second plurality of content items for the second card based on the second object definition (e.g., the parameter that is included in the target card property of the second object definition). Card engine 121 may transform the second plurality of content items into a card-ready format. The card-ready format may be a predefined template format for a specific type of card. Card engine 121 may generate an output object based on the transformed content items. For example, in response to an indication that a source host identifier is clicked by a user from the first card (e.g., card 910 in FIG. 9), card engine 121 may generate the second object definition for that source host identifier as the second object. Card engine 121 may retrieve the second plurality of content items for the second card (e.g., card 920 in FIG. 9) based on the second object definition. Once the second plurality of content items are transformed into a card-ready format that is predefined for the card type associated with the second card, card engine 121 may generate an output object (that is the second object) using the transformed content items. Therefore, the second card that is being presented on the user interface may comprise the second content tile (e.g., content tile 922 in FIG. 9) that describes the second object. This second content tile includes the second plurality of content items that have been retrieved and transformed into the appropriate card-ready format.

Card engine 121 may generate and/or provide a playbook to guide a user through a research or investigation process. A playbook may comprise a plurality of cards arranged in a predefined order. The plurality of cards in the playbook may be presented such that one card appears at a time according to the predefined order, or the plurality of cards may be presented such that all cards in the playbook appear at the same time in the predefined order.

A playbook may be generated and/or created in various ways. In one example, a playbook editor may design a playbook by creating object definitions for each card to be included in the playbook. These object definitions may inherit the parameter(s) from a particular security alert (e.g., once a security analyst investigating this particular alert decides to use this playbook, the playbook and the object definitions therein would inherit the parameter(s) from the object definition associated with the alert). In another example, a playbook can be generated and/or created based on an existing investigation or research. In this example, a particular collection of cards created during an investigation or research can be converted to a new playbook. The playbook being created would be arranged in the same order or sequence as this collection of cards. Any parameter(s) that were used in the object definitions of this collection of cards during the investigation or research would be removed from the playbook being created. Once this playbook is selected for use to investigate a particular security alert, the playbook may then inherit a new set of parameter(s) from the object definition associated with the particular security alert.

Figure 11:
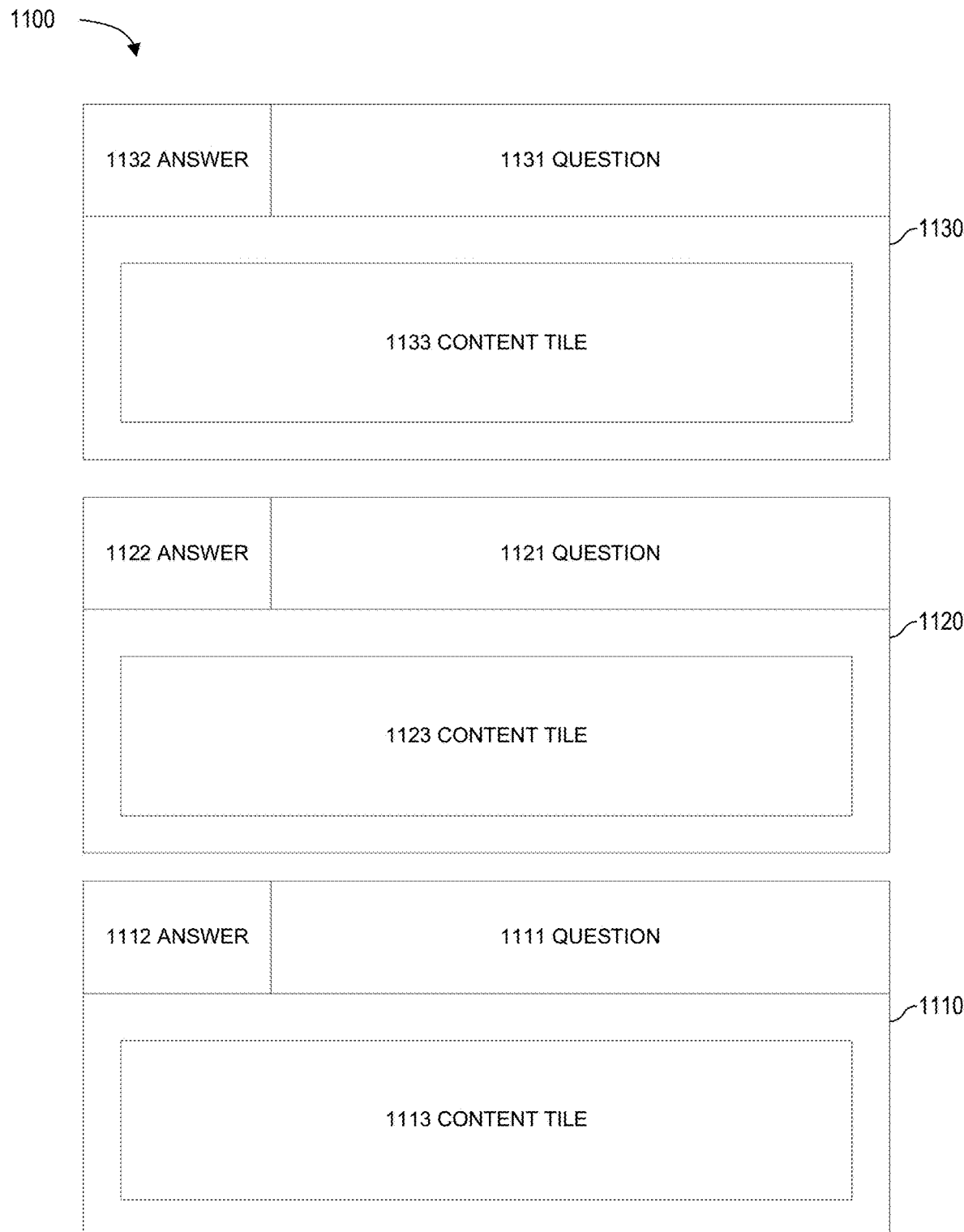
FIG. 11 is a diagram depicting an example user interface for presenting a plurality of cards from a playbook.

In the example illustrated in FIG. 11, cards 1110, 1120, and 1130 are part of a plurality of cards in a particular playbook. Card 1110 may have a content tile 1113 showing information about a particular security alert (e.g., destination IPs, source host identifiers, logon types, counts, etc.). Card 1120 may have a content tile 1123 showing information about adjacent alerts related to the particular security alert of card 1110 (e.g., an alert identifier, a start time, an end time, an attack stage, a confidence level, a severity level, an alert status, etc. for each adjacent alert). Card 1130 may have a content tile 1133 showing information about forensic data or logs about the alert.

In some implementations, each playbook card may be accompanied by a corresponding question and/or corresponding answer choices. Returning to the example of FIG. 11, a question 1111 may ask the user "is this a suspicious behavior?" In response to the question 1111, the user may choose an answer from answer choices 1112. For example, the user may indicate an answer by clicking on a GUI button for "Yes," a GUI button for "No," or a GUI button for "Unsure." Once the answer is provided by the user, card 1120 may appear on the user interface. Similarly, a question 1121 may ask the user "is this a suspicious behavior?" In response to the question 1121, the user may choose an answer from answer choices 1122 to indicate "Yes," "No," or "Unsure." Once the answer is provided by the user, card 1130 may appear on the user interface. In some instances, a playbook card may include another content tile that provides additional information about the question itself to help the user to provide an appropriate answer.

In some implementations, an answer chosen for a particular playbook card may influence a selection of the next playbook card to be presented on the user interface. For example, if the answer "Yes" is chosen for card 1110 as to the question "did you see any unusual Domain Name System (DNS) activity?", card engine 121 may be programmed to render card 1120 as the next card where card 1120 is a DNS activity card. On the other hand, if the answer "No" is chosen for card 1110, card engine 121 may render card 1130 as the next card instead of card 1120.

Figure 12:
FIG. 12 is a diagram depicting an example user interface for presenting a playbook conclusion card.

In some implementations, at the end of the playbook, card engine 121 may generate and/or provide a playbook conclusion card. An example playbook conclusion card is illustrated in FIG. 12. Playbook conclusion card 1210 may comprise, for example, an answers section 1211, an accuracy section 1212, and an investigation resolution section 1213. Answers section 1211 may comprise information about answers to a plurality of questions associated with the playbook (e.g., the number of "Yes" answers, the number of "No" answers, etc.). Accuracy section 1212 may prompt the user to indicate a degree of accuracy of the security alert. Investigation resolution section 1213 may prompt the user to indicate whether a playbook-based security investigation should be continued by another user. In response to an indication that the playbook-based security investigation (e.g., a history of cards 1110, 1120, 1130 in FIG. 11 and/or playbook conclusion card 1210 in FIG. 12) should be continued by and/or shared with another user, that user may be allowed to access the playbook-based security investigation (e.g., by access engine 123 as discussed in detail below).

Card engine 121 may determine a plurality of playbooks that can be recommended based on characteristics (e.g., IP address, user, attack stage, alert status, category, etc.) of a particular security alert. Card engine 121 may receive, via the user interface, an indication that a particular playbook among the recommended plurality of playbooks is selected for investigating the security alert.

In some implementations, in response to the indication that the particular playbook is selected, card engine 121 may cause the particular playbook and the cards therein to inherit the parameter(s) from the object definition associated with the particular security alert. For example, an object definition corresponding to a card in the particular playbook may comprise the parameter(s) inherited from the object definition associated with the particular security alert.

User interface engine 122 may present a card (e.g., generated by card engine 121 as discussed above) and/or cause the card to be displayed on a user interface. In some implementations, user interface engine 122 may present cards in a playbook (e.g., generated by card engine 121 as discussed above) and/or cause the playbook cards to be displayed on a user interface.

As a user (including a single user, a group of users, users with a particular user role, or users while performing a particular task or action) continues to interact with various cards being presented on the user interface and request additional details about certain content items, more cards would appear on the user interface. This collection of cards may be arranged in the order of time (e.g., the newest card to the oldest card), priority, importance, and/or another particular order of arrangement. In one example, the cards may appear stacked on top of each other from the newest card (e.g., card 930 in FIG. 9) to the oldest card (e.g., card 910 in FIG. 9). In this way, this collection of cards would provide a well-documented history of the user's research or investigation. The user or any other user who is granted access to this collection of cards may scroll up and down to review the history of the research or investigation.

Figure 10:
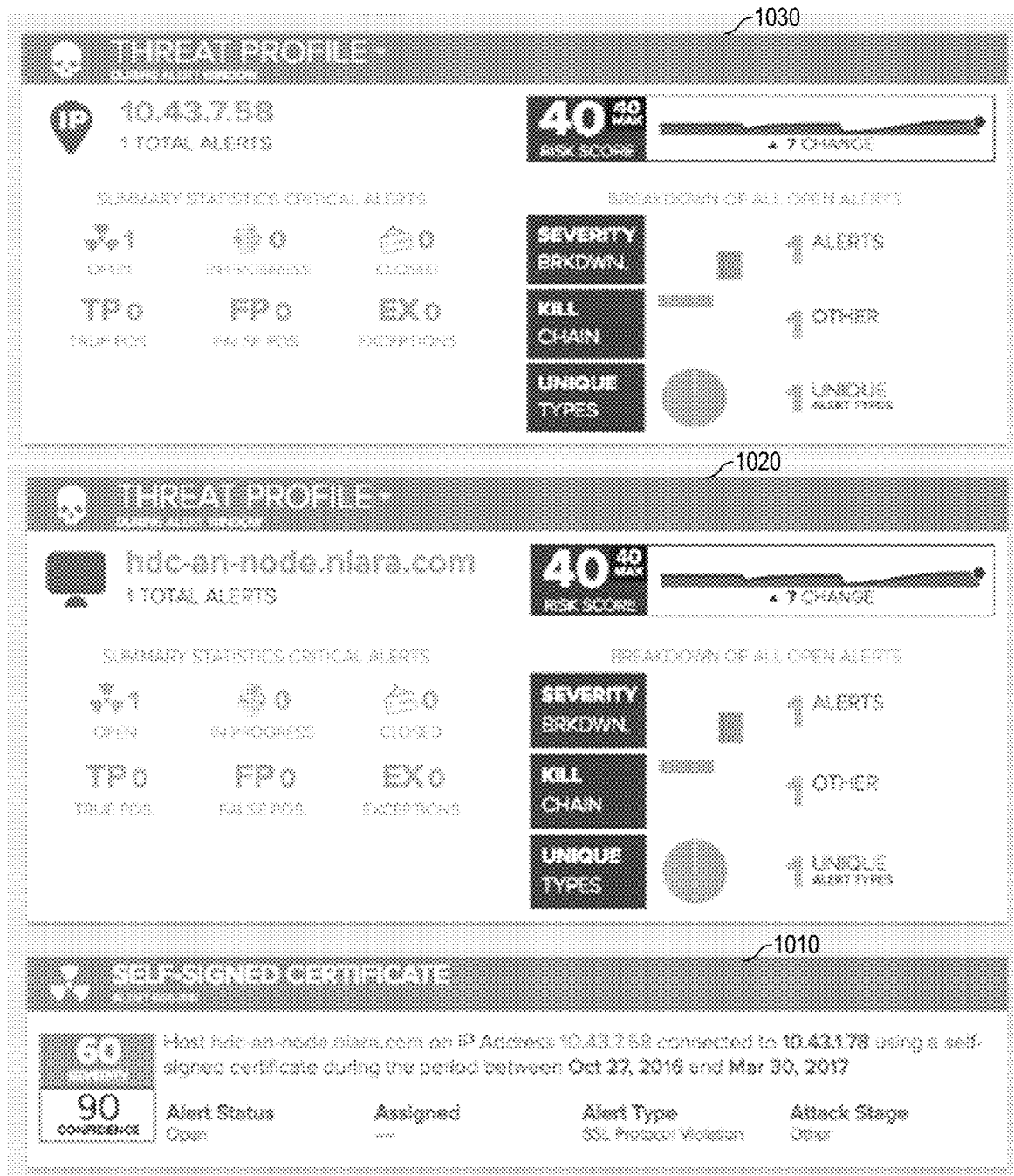
FIG. 10 is a diagram depicting an example user interface for presenting a plurality of cards that appear stacked on top of each other.

An example user interface for displaying a collection of cards is illustrated in FIG. 10. In the example illustrated in FIG. 10, a card 1010 for a particular security alert may have a card header such as "Self-Signed Certificate" with the corresponding alert identifier, and a content tile with information about a source host identifier associated with the alert, an Internet Protocol (IP) address associated with the alert, a severity level for the alert, a confidence level for the alert, an alert status, a user identifier (e.g., a user or security analyst assigned to an investigation task for the alert, a user that is associated with the IP address, and/or any user who might be related to the alert), an alert type, an attack stage, a port (e.g., an identification of the port via which the network connection was made, an indication that a port scan was made, and/or other information about a port or port usage), a protocol (e.g., volume of network traffic over the Transmission Control Protocol (TCP)), a geographical location (e.g., a user or entity's appearing in multiple locations in a short timeframe (land speed violation), a particular geographical location that has been flagged to be a problematic area, and/or other information about a geographical location), a timeframe associated with the alert, and/or other information.

When a user clicks on the hyperlinked GUI element for the source host identifier "hdc-an-node.niara.com" from card 1010, user interface engine 122 may present card 1020 (e.g., generated by card engine 121 as discussed above) and/or cause card 1020 to be displayed on the user interface. Card 1020 for the source host identifier "hdc-an-node.niara.com" has a content tile with the information about the source host identifier, including the number of alerts associated with the source host identifier, summary statistics for critical alerts associated with the source host identifier, a risk score associated with the source host identifier, and a breakdown of all open alerts associated with the source host identifier.

When the user subsequently clicks on another hyperlinked GUI element for the IP address "10.43.7.58" from card 1010, user interface engine 122 may present card 1030 (e.g., generated by card engine 121 as discussed above) and/or cause card 1030 to be displayed on the user interface. Card 1030 for the IP address "10.43.7.58" has a content tile with the information about the IP address, including the number of alerts associated with the IP address, summary statistics for critical alerts associated with the IP address, a risk score associated with the IP address, and a breakdown of all open alerts associated with the IP address.

Access engine 123 may determine an appropriate access level for various cards in card system 110. Returning to the above example as discussed with respect to card engine 121, the first, second, and third cards (e.g., cards 910, 920, and 930 in FIG. 9) may be associated with a particular user account, a particular user role, or a particular task.

Continuing with the example, the selections of the first and second content items may be performed by a same user. In this case, the first card and the second and third cards that appeared in response to these user selections may be associated with the particular user account of this user. This may mean that when the user logs into his or her user account, the user may access all three cards by viewing the three cards stacked on top of each other so that the user can review the history of his research or investigation, editing any one of the cards, making a duplicate card or a duplicate collection of cards for further research or investigation, and/or sharing any of the cards with another user. In some instances, the user account may be associated with a plurality of users. Consider this scenario: there is a team of people conducting an investigation on a particular security alert. A first user of this team made a user selection of the first content item, which caused the second card to appear on the user interface. Subsequently, a second user of this team made a user selection of the second content item, which caused the third card to appear on the user interface. Although different users interacted with the cards, each user of this team may access all three cards by viewing the three cards stacked on top of each other so that each user of the team can review the history of the team's collective research or investigation, editing any one of the cards, making a duplicate card or a duplicate collection of cards for further research or investigation, and/or sharing any of the cards with another user. "Sharing," as used herein, refers to granting access to a designated user or user(s). How much access should be granted may be automatically determined by system 110 or manually determined based on user input. For example, a card may be shared with a particular user such that the particular user has an ability to view the card without an ability to edit the card. In another example, a card may be shared with a particular user such that the user has an ability to view and make a duplicate of the card without an ability to edit the card.

In some implementations, the selections of the first and second content items may be performed by users having a same user role. In this case, the first card and the second and third cards that appeared in response to these user selections may be associated with the particular user role. Consider this scenario: there is a group of users with a first user role (e.g., an investigation manager role), and another group of users with a second user role (e.g., an analyst role). A first user with the first user role made a user selection of the first content item, which caused the second card to appear on the user interface. Subsequently, a second user with the first user role made a user selection of the second content item, which caused the third card to appear on the user interface. Although different users interacted with the cards, each user with this first role may access all three cards by viewing the three cards stacked on top of each other so that each user in the first role can review the history of the research or investigation, editing any one of the cards, making a duplicate card or a duplicate collection of cards for further research or investigation, and/or sharing any of the cards with another user. On the other hand, users with the second user role would not be able to access the three cards.

In some implementations, the selections of the first and second content items may be performed as part of a same task. In this example, a plurality of users may be performing a same research or investigation task. Similar to the above examples, although different users interacted with the cards while performing this same task, each user assigned to this task may access all three cards by viewing the three cards stacked on top of each other so that each user can review the history of the research or investigation, editing any one of the cards, making a duplicate card or a duplicate collection of cards for further research or investigation, and/or sharing any of the cards with another user.

Similarly, a plurality of cards in a playbook (cards 1110, 1120, and 1130 in FIG. 11) may be associated with a particular user account, a particular user role, or a particular task. Also, a playbook (e.g., a playbook that is newly created, is in-use, or is completed), a playbook conclusion card, and/or any of the cards within the playbook may be shared with another user in a similar manner as described above.

Storage engine 124 may store content items, object definitions, objects, content tiles, card headers, cards, and/or other information related to card system 110 in a data storage (e.g., data storage 129 in FIG. 1).

In some implementations, storage engine 124 may store a collection of cards (e.g., a history of an investigation or research task, generated by card engine 122 as discussed above) in a particular order or sequence of those cards at the time of storing or saving (e.g., how those cards are currently arranged at the time of storing or saving). In other words, storage engine 124 may store the current state of investigation or research progress at the time of storing or saving. In this way, a user who has access to this collection of cards (e.g., a user originally assigned to the investigation or research task, a user who was given access through "sharing" as defined above) may save the progress, re-initiate the investigation or research by picking up from where he or she was left off, and/or share the saved version of the cards with another user to review and/or continue the investigation.

In some implementations, a card and/or a collection of cards (e.g., generated by card engine 121 as discussed above) may be stored as a static image file (e.g., jpeg, png, etc.). Although the card in this static image file format would not be interactive (e.g., a user is not able to click on any of the content items in the card), the small file size of this static image file allows card system 110 to retain the card for a longer period of time. On the other hand, the raw data for the card, which makes the card interactive, due to its large file size, may need to be deleted from the data storage after a certain predefined time period (e.g., after 90 days).

In performing their respective functions, engines 121-124 may access data storage 129 and/or other suitable database(s). Data storage 129 may represent any memory accessible to card system 110 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Card system 110 may access data storage 129 locally or remotely via network 50 or other networks.

Data storage 129 may include a database to organize and store data. The database may reside in a single or multiple physical device(s) and in a single or multiple physical location(s). The database may store a plurality of types of data and/or files and associated data or file description, administrative information, or any other data.

Figure 2:
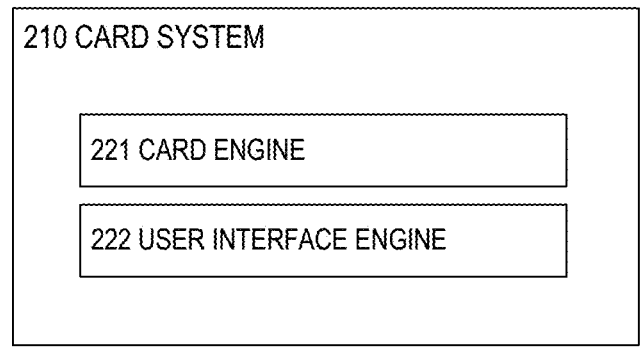
FIG. 2 is a block diagram depicting an example card system.

FIG. 2 is a block diagram depicting an example card system 210. Card system 210 may comprise a card engine 221, a user interface engine 222, and/or other engines. Engines 221-222 represent engines 121-122, respectively.

Figure 3:
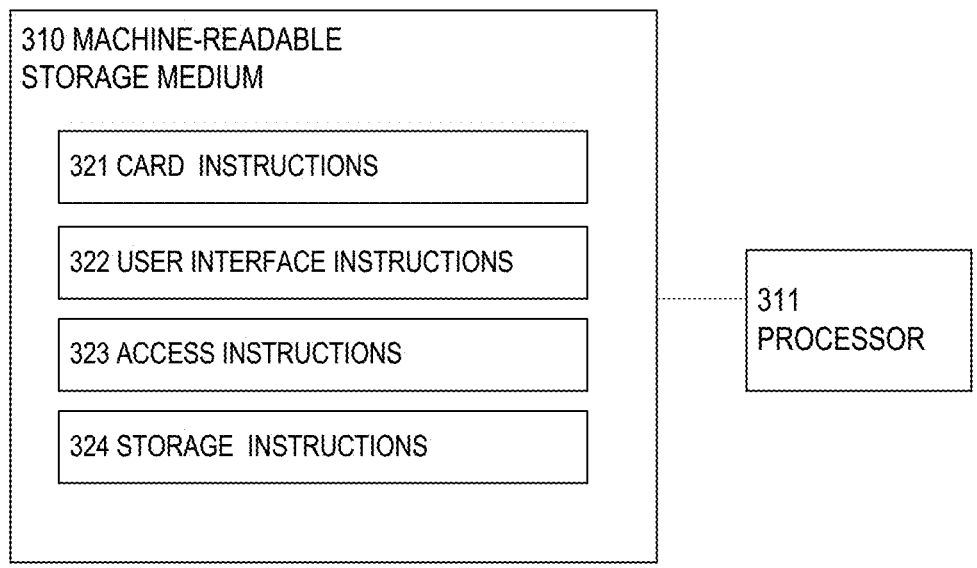
FIG. 3 is a block diagram depicting an example machine-readable storage medium comprising instructions executable by a processor for enabling playbook-based security investigations using a card system framework.

FIG. 3 is a block diagram depicting an example machine-readable storage medium 310 comprising instructions executable by a processor for enabling playbook-based security investigations using a card system framework.

In the foregoing discussion, engines 121-124 were described as combinations of hardware and programming. Engines 121-124 may be implemented in a number of fashions. Referring to FIG. 3, the programming may be processor executable instructions 321-324 stored on a machine-readable storage medium 310 and the hardware may include a processor 311 for executing those instructions. Thus, machine-readable storage medium 310 can be said to store program instructions or code that when executed by processor 311 implements card system 110 of FIG. 1.

In FIG. 3, the executable program instructions in machine-readable storage medium 310 are depicted as card instructions 321, user interface instructions 322, access instructions 323, and storage instructions 324. Instructions 321-324 represent program instructions that, when executed, cause processor 311 to implement engines 121-124, respectively.

Figure 4:
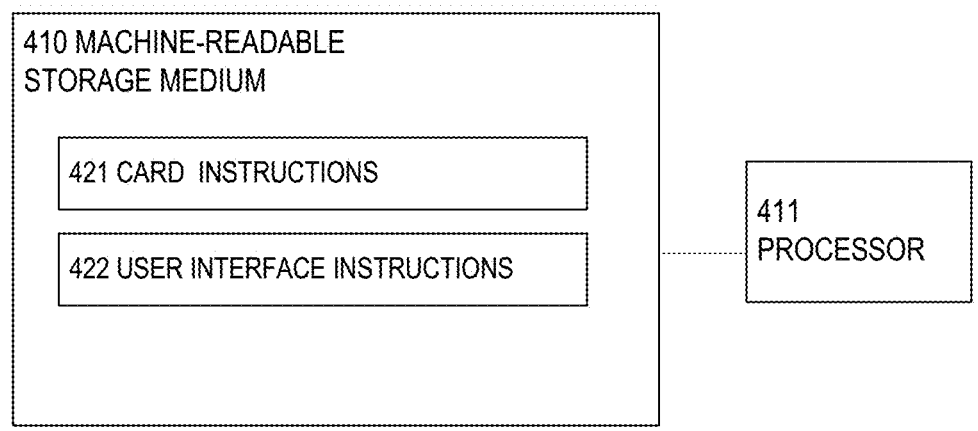
FIG. 4 is a block diagram depicting an example machine-readable storage medium comprising instructions executable by a processor for enabling playbook-based security investigations using a card system framework.

FIG. 4 is a block diagram depicting an example machine-readable storage medium 410 comprising instructions executable by a processor for enabling playbook-based security investigations using a card system framework.

Referring to FIG. 4, the programming may be processor executable instructions 421-422 stored on a machine-readable storage medium 410 and the hardware may include a processor 411 for executing those instructions. Thus, machine-readable storage medium 410 can be said to store program instructions or code that when executed by processor 411 implements card system 110 of FIG. 1.

In FIG. 4, the executable program instructions in machine-readable storage medium 410 are depicted as card instructions 421 and user interface instructions 422. Instructions 421-422 represent program instructions that, when executed, cause processor 411 to implement engines 121-122, respectively.

Machine-readable storage medium 310 (or machine-readable storage medium 410) may be any electronic, magnetic, optical, or other physical storage device that contains or stores executable instructions. In some implementations, machine-readable storage medium 310 (or machine-readable storage medium 410) may be a non-transitory storage medium, where the term "non-transitory" does not encompass transitory propagating signals. Machine-readable storage medium 310 (or machine-readable storage medium 410) may be implemented in a single device or distributed across devices. Likewise, processor 311 (or processor 411) may represent any number of processors capable of executing instructions stored by machine-readable storage medium 310 (or machine-readable storage medium 410). Processor 311 (or processor 411) may be integrated in a single device or distributed across devices. Further, machine-readable storage medium 310 (or machine-readable storage medium 410) may be fully or partially integrated in the same device as processor 311 (or processor 411), or it may be separate but accessible to that device and processor 311 (or processor 411).

In one example, the program instructions may be part of an installation package that when installed can be executed by processor 311 (or processor 411) to implement card system 110. In this case, machine-readable storage medium 310 (or machine-readable storage medium 410) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 (or machine-readable storage medium 410) may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-324, and/or other instructions. As an alternative or in addition to retrieving and executing instructions, processor 311 may include at least one electronic circuit comprising a number of electronic components for performing the functionality of at least one of instructions 321-324, and/or other instructions.

Processor 411 may be at least one central processing unit (CPU), microprocessor, and/or other hardware device suitable for retrieval and execution of instructions stored in machine-readable storage medium 410. Processor 411 may fetch, decode, and execute program instructions 421-422, and/or other instructions. As an alternative or in addition to retrieving and executing instructions, processor 411 may include at least one electronic circuit comprising a number of electronic components for performing the functionality of at least one of instructions 421-422, and/or other instructions.

Figure 5:
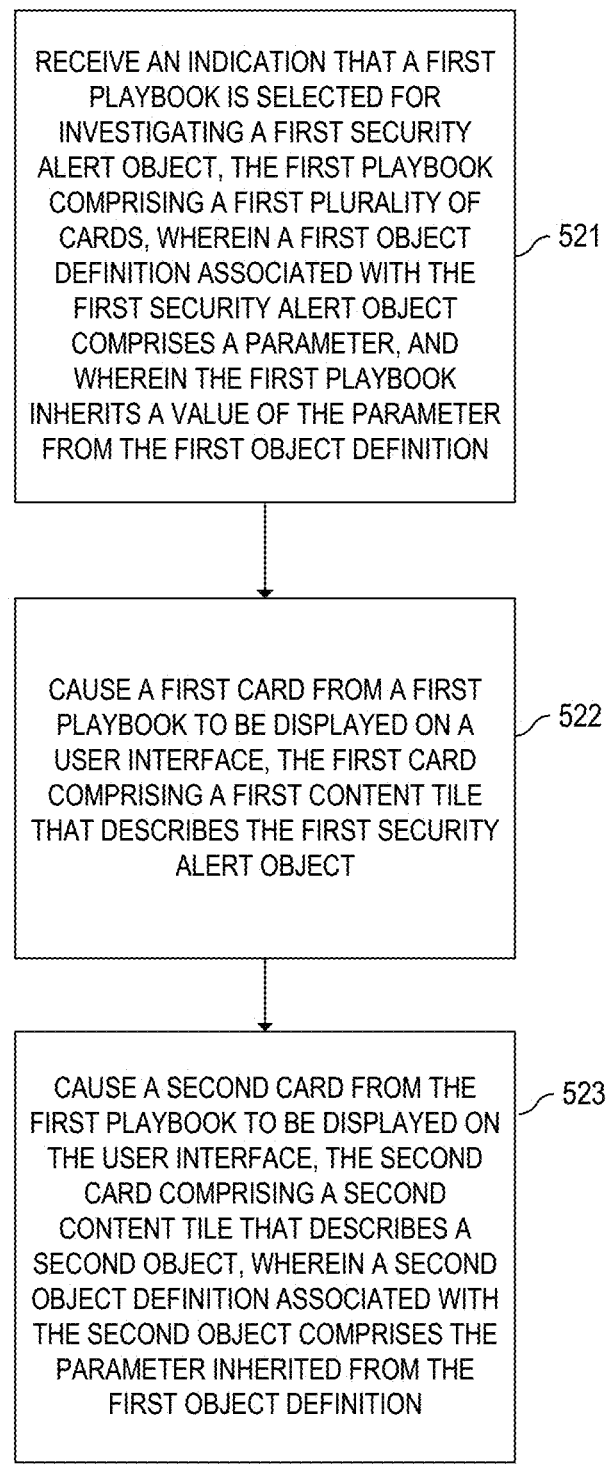
FIG. 5 is a flow diagram depicting an example method for enabling playbook-based security investigations using a card system framework.

FIG. 5 is a flow diagram depicting an example method 500 for enabling playbook-based security investigations using a card system framework. The various processing blocks and/or data flows depicted in FIG. 5 (and in the other drawing figures such as FIG. 6) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 500 as illustrated (and described in greater detail below) is meant to be an example and, as such, should not be viewed as limiting. Method 500 may be implemented in the form of executable instructions stored on a machine-readable storage medium, such as storage medium 310, and/or in the form of electronic circuitry.

Referring back to FIG. 1, card engine 121 may be responsible for implementing block 521. User interface engine 122 may be responsible for implementing blocks 522 and 523.

Figure 6:
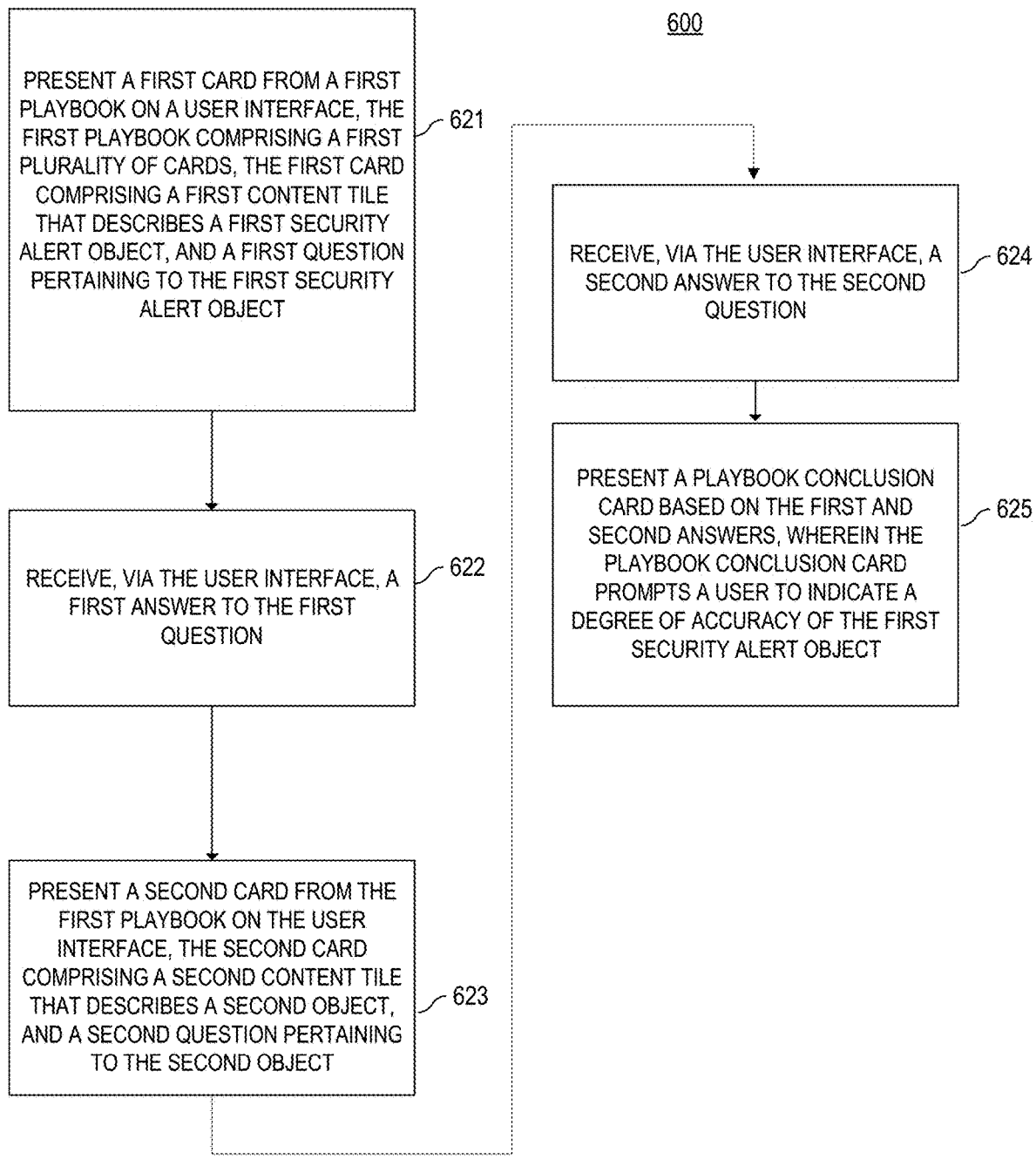
FIG. 6 is a flow diagram depicting an example method for enabling playbook-based security investigations using a card system framework.

FIG. 6 is a flow diagram depicting an example method 600 for enabling playbook-based security investigations using a card system framework. Method 600 as illustrated (and described in greater detail below) is meant to be an example and, as such, should not be viewed as limiting. Method 600 may be implemented in the form of executable instructions stored on a machine-readable storage medium, such as storage medium 310, and/or in the form of electronic circuitry.

Referring back to FIG. 1, card engine 121 may be responsible for implementing blocks 622 and 624. User interface engine 122 may be responsible for implementing blocks 621, 623, and 625.

FIG. 7 is a diagram depicting an example user interface 700 for presenting a card. User interface 700 (and other user interfaces described herein) may be used to cause various actions to be performed by card system 110.

FIG. 8 is a diagram depicting an example user interface 800 for presenting a card with a plurality of content tiles.

Figure 9:
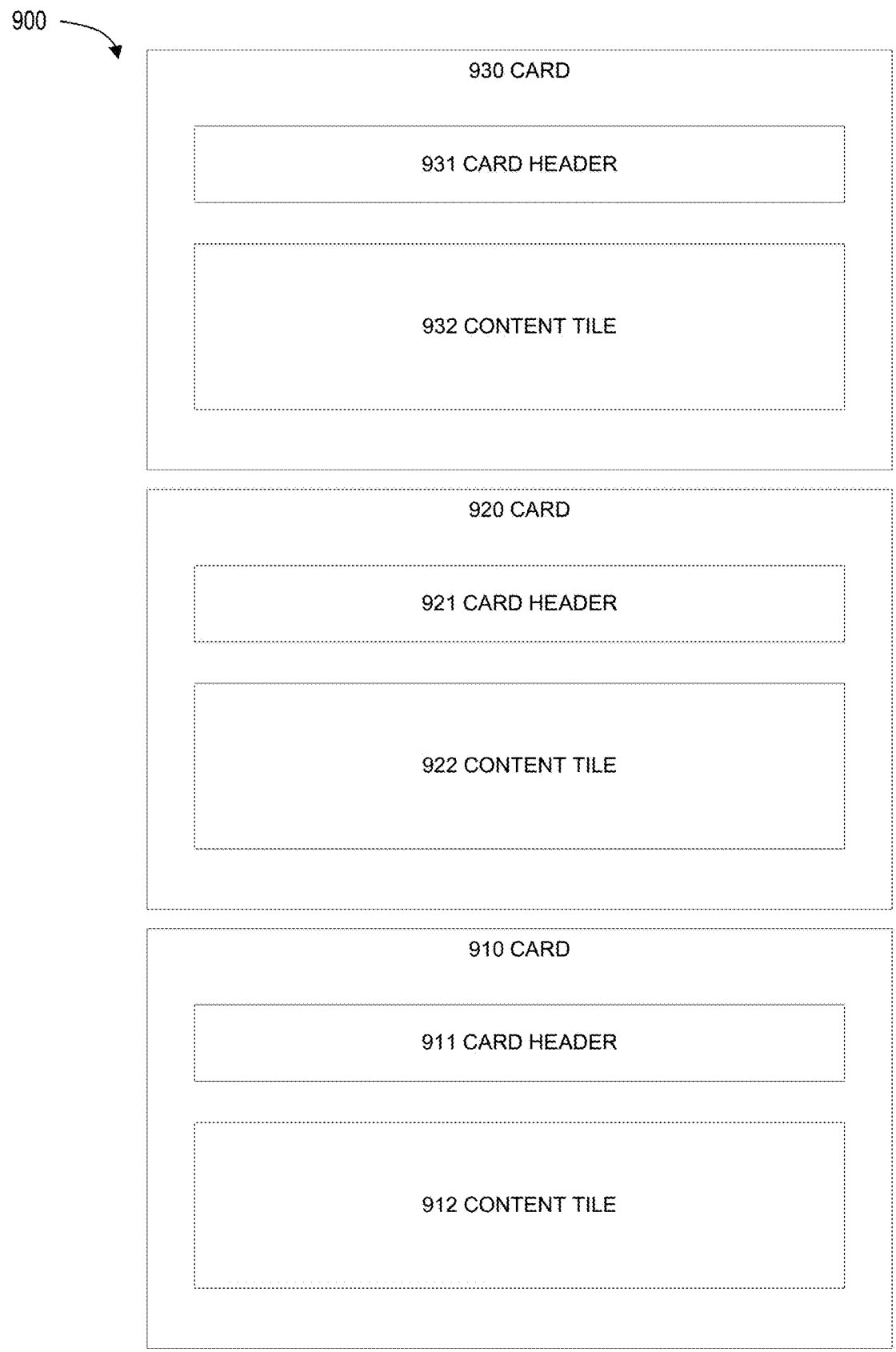
FIG. 9 is a diagram depicting an example user interface for presenting a plurality of cards that appear stacked on top of each other.

FIG. 9 is a diagram depicting an example user interface 900 for presenting a plurality of cards that appear stacked on top of each other.

FIG. 10 is a diagram depicting an example user interface 1000 for presenting a plurality of cards that appear stacked on top of each other.

FIG. 11 is a diagram depicting an example user interface 1100 for presenting a plurality of cards from a playbook.

FIG. 12 is a diagram depicting an example user interface 1200 for presenting a playbook conclusion card.

FIGS. 7-12 are discussed herein with respect to FIG. 1.

The foregoing disclosure describes a number of example implementations for enabling playbook-based security investigations. The disclosed examples may include systems, devices, computer-readable storage media, and methods for enabling playbook-based security investigations. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A non-transitory machine-readable storage medium comprising instructions executable by a hardware processor for enabling playbook-based security investigations using a card system framework, the machine-readable storage medium comprising:
   instructions to present a first card from a first playbook on a user interface, the first playbook comprising a first plurality of cards, the first card comprising a first content tile that describes a first security alert object, and a first question pertaining to the first security alert object;
   instructions to receive, via the user interface, a first answer to the first question;
   instructions to present a second card from the first playbook on the user interface, the second card comprising a second content tile that describes a second object, and a second question pertaining to the second object;
   instructions to receive, via the user interface, a second answer to the second question; and
   instructions to present a playbook conclusion card based on the first and second answers, wherein the playbook conclusion card prompts a user to indicate a degree of accuracy of the first security alert object.

2. The non-transitory machine-readable storage medium of claim 1, wherein the first content tile comprises information about a particular security alert, including at least one of: a destination Internet Protocol (IP) address, a source host identifier, a logon type, and a count.

3. The non-transitory machine-readable storage medium of claim 2, wherein the second content tile comprises information about alerts that are adjacent to the particular security alert, including at least one of: an alert identifier, a start time, an end time, an attack stage, a confidence level, a severity level, and an alert status.

4. The non-transitory machine-readable storage medium of claim 3, comprising:
   instructions to present a third card from the first playbook on the user interface, the third card comprising a third content tile that comprises forensic data.

5. The non-transitory machine-readable storage medium of claim 1, wherein the first and second cards appear stacked on top of each other on the user interface.

6. The non-transitory machine-readable storage medium of claim 1, the instructions to present the second card from the first playbook on the user interface comprise:
   instructions to select the second card from the first plurality of cards based on the first answer.

7. The non-transitory machine-readable storage medium of claim 1, comprising:
   instructions to present a third content tile as part of the first card, the third content tile providing additional information to help a user to answer the first question.

8. The non-transitory machine-readable storage medium of claim 1, wherein a plurality of playbooks are associated with the first security alert object, comprising:
   instructions to receive, via the user interface, an indication that a second playbook among the plurality of playbooks is requested;
   instructions to present a third card from second playbook on the user interface, the second playbook comprising a second plurality of cards, the third card comprising a third content tile that describes the first security alert object, a third question pertaining to the first security alert object.

9. The non-transitory machine-readable storage medium of claim 1, wherein the playbook conclusion card prompts the user to indicate whether a playbook-based security investigation should be continued by another user.

10. The non-transitory machine-readable storage medium of claim 9, comprising:
    in response to an indication that the playbook-based security investigation should be continued by the another user, instructions to allow the another user to access the playbook-based security investigation, wherein the access comprises at least one of: an access to edit, an access to view, and an access to create a duplicate card or investigation.

11. The non-transitory machine-readable storage medium of claim 1, wherein the playbook conclusion card comprises a summary of answers to a plurality of questions associated with the first playbook.

12. The non-transitory machine-readable storage medium of claim 1, wherein an object definition associated with the first security alert object comprises a parameter, and wherein the first playbook inherits a value of the parameter from the object definition.

13. A method for enabling playbook-based security investigations using a non-transitory computer-readable storage medium comprising instructions executable by a processor of a card system framework, the method comprising:
    receiving, via the processor, an indication that a first playbook is selected for investigating a first security alert object, the first playbook comprising a first plurality of cards, wherein a first object definition associated with the first security alert object comprises a parameter, and wherein the first playbook inherits a value of the parameter from the first object definition;
    causing, via the processor, a first card from the first playbook to be displayed on a user interface, the first card comprising a first content tile that describes the first security alert object; and
    causing, via the processor, a second card from the first playbook to be displayed on the user interface, the second card comprising a second content tile that describes a second object, wherein a second object definition associated with the second object comprises the parameter inherited from the first object definition.

14. The method of claim 13, wherein the parameter comprises at least one of: (i) a timeframe within which timestamps of content items to be retrieved for the first plurality of cards should be, (ii) an object or user identifier, (iii) a status, and (iv) category.

15. The method of claim 13, comprising:
    determining a plurality of playbooks to be recommended based on characteristics of the first security alert object, the plurality of playbooks including the first playbook.

16. The method of claim 15, comprising:
    receiving an indication that a second playbook is selected from the plurality of playbooks for investigating the first security alert object, the second playbook comprising a second plurality of cards, wherein the second playbook inherits a value of the parameter from the first object definition.

17. The method of claim 13, wherein the first security alert object is associated with at least one of: a source host identifier and an Internet Protocol (IP) address.

18. A system for enabling playbook-based security investigations using a card system framework, the system comprising a hardware processor that executes machine-readable instructions that cause the system to:

receive an indication that a first playbook is selected for investigating a first security alert object, the first playbook comprising a first plurality of cards, wherein a first object definition associated with the first security alert object comprises a parameter, and wherein the first playbook inherits a value of the parameter from the first object definition;

cause a first card from a first playbook to be displayed on a user interface, the first card comprising a first content tile that describes the first security alert object;

cause a second card from the first playbook to be displayed on the user interface, the second card comprising a second content tile that describes a second object, wherein a second object definition associated with the second object comprises the parameter inherited from the first object definition; and cause a playbook conclusion card to be displayed on the user interface.

19. The system of claim 18, the system comprising the hardware processor that executes the machine-readable instructions that cause the system to:

generate the second content tile based on the parameter.

20. The system of claim 18, the system comprising the hardware processor that executes the machine-readable instructions that cause the system to:

retrieve a plurality of content items for the second card based on the parameter; and generate the second content tile with the plurality of content items.

21. The system of claim 18, the system comprising the hardware processor that executes the machine-readable instructions that cause the system to:

generate the first playbook based on an existing security investigation.

* * * * *